July 5, 1949.  P. A. BIRCHFIELD  2,475,540
THERMOSTATIC CONTROL VALVE
Filed Aug. 14, 1944  2 Sheets-Sheet 1
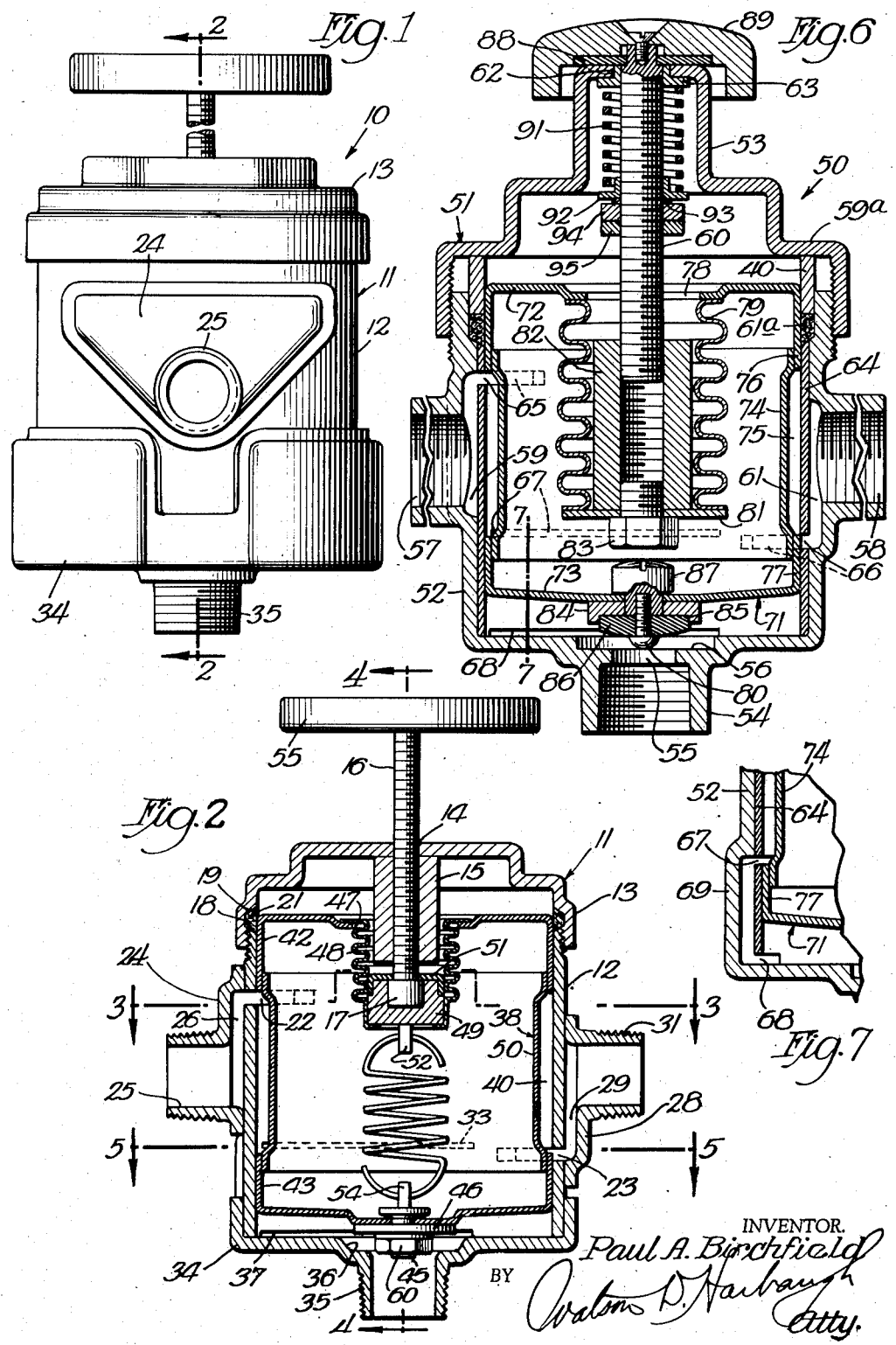
INVENTOR.
Paul A. Birchfield
BY
Watson D. Harbaugh
Atty.

July 5, 1949.　　　　P. A. BIRCHFIELD　　　2,475,540
THERMOSTATIC CONTROL VALVE
Filed Aug. 14, 1944　　　　　　　　　　　　　2 Sheets-Sheet 2
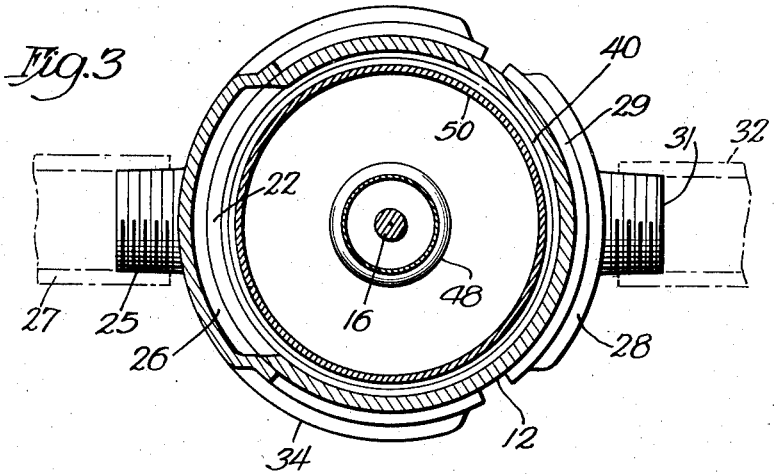
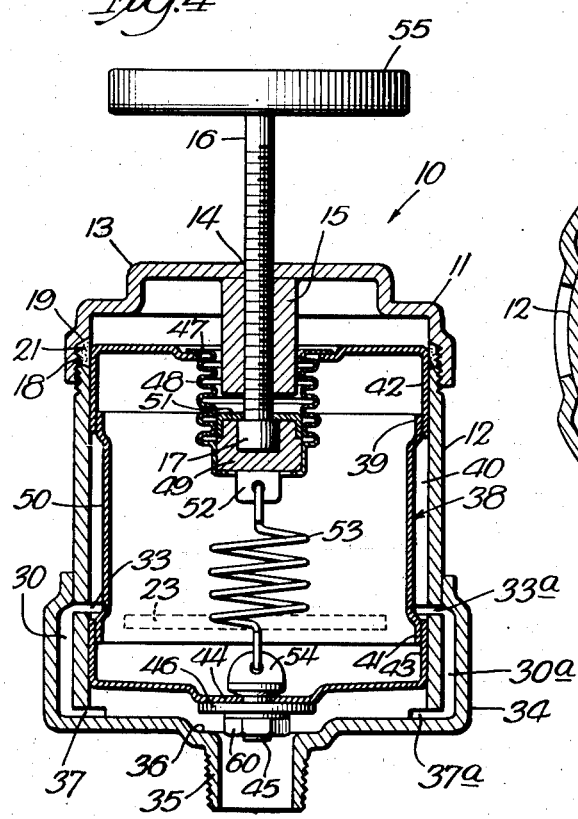
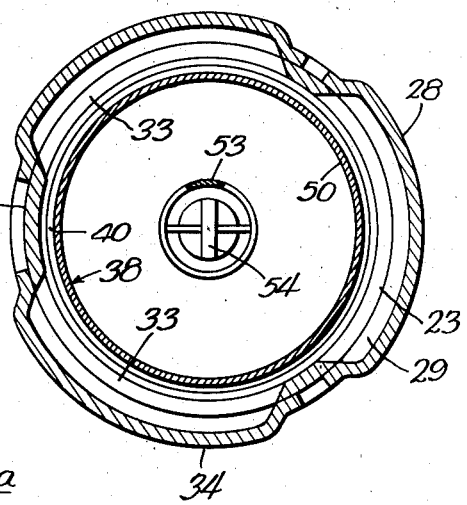
INVENTOR.
Paul A. Birchfield
BY Watson D. Harbaugh
Atty.

Patented July 5, 1949

2,475,540

UNITED STATES PATENT OFFICE 2,475,540

THERMOSTATIC CONTROL VALVE

Paul A. Birchfield, Park Ridge, Ill.

Application August 14, 1944, Serial No. 549,392

10 Claims. (Cl. 236—12)

This invention relates to valves, and more particularly to valves for automatically controlling the mixing of hot and cold fluids and insuring the discharge thereof at a substantially uniform temperature.

One of the objects of the invention is the provision of a new and improved valve for automatically controlling the mixing and discharge of hot and cold fluids that is especially useful in hotels, private dwellings, and the like, for automatically controlling the temperature of water for lavatories, tub and shower baths, and the like.

Another object of the invention is the provision of a new and improved valve that will automatically stop the flow of a mixed fluid when the temperature rises above or falls below predetermined limits after the valve has been set to deliver the mixed fluid at a predetermined temperature.

A further object of the invention is the provision of a new and improved mixing valve that may be readily adjusted to deliver a mixture of hot and cold water at a predetermined temperature, and automatically maintain that temperature within predetermined limits.

Another object of the invention is the provision of a new and improved mixing and control valve that is manually operated to control the flow of a mixed hot and cold liquid, together with means for normally automatically maintaining said mixture at a predetermined temperature, and for stopping the flow of said mixture when its temperature abnormally rises or falls above or below predetermined limits.

Another object of the invention is the provision of a new and improved mixing and control valve that may be manually operated for starting and stopping the flow of supply liquid, or for automatically controlling the temperature of the mixed fluids by normally maintaining the mixture at a substantially constant temperature.

A still further object of the invention is the provision of a new and improved automatically controlled mixing valve that is simple in construction, relatively inexpensive to manufacture, efficient in operation, and that may be easily and readily assembled.

Other and further objects and advantages of the invention will appear from the following description, taken in connection with the accompanying drawings in which Fig. 1 is a side elevation of the mixing valve;

Fig. 2 is an elevation similar to Fig. 1, taken at right angles thereto;

Fig. 3 is a section on the line 3—3 of Fig. 1;

Fig. 4 is a section on the line 4—4 of Fig. 3;

Fig. 5 is a section on the line 5—5 of Fig. 2;

Fig. 6 is a vertical section similar to Fig. 2, but showing a modified form of the invention; and Fig. 7 is a section on the line 7—7 of Fig. 6, with parts broken away.

In the use of mixtures of hot and cold water in lavatories, tub and shower baths, and in numerous chemical processes and manufacturing industries, it is often desirable, or even necessary, that the mixture on its discharge be automatically maintained at a predetermined temperature, which may be varied as desired. It is also desirable, in certain uses, that means be provided for automatically cutting off the flow of the mixture when the temperature thereof, for any reason whatever, rises above a predetermined maximum or falls below a predetermined minimum. The present invention seeks to accomplish these functions by utilizing a greatly simplified valve and control mechanism.

For the purpose of disclosure the drawings illustrate an embodiment of the invention especially useful in mixing and controlling the flow of hot and cold water for lavatories, baths, and the like. While the description will be confined principally to a device for this purpose, it is understood that the language used is for the purpose of disclosure only, and is not intended as words of limitation.

Referring now to the drawings, the reference character 10 designates the mixing valve, which comprises a casing 11 having a cylindrical casing member or intermediate section or body portion 12, threaded at its upper end, to which is detachably connected a cap 13 having an axial downwardly extending projection 15 rigidly connected to the inside of the cap 13 and extending downwardly therefrom. The cap and downwardly extending projection are provided with an axial screw-threaded opening for receiving a threaded valve stem 16, the lower end of which is enlarged for constituting a swivel head 17, as will presently appear. The upper end of the cylindrical casing member 12 is beveled outwardly and upwardly, as at 18, and the cap is provided with a downwardly and outwardly beveled surface, as at 19. The bevels 18 and 19 cooperate to form a recess within which is mounted a compressible gasket 21 for cooperating with a spool valve for making an air and liquid tight joint, as will presently appear. The gasket is compressed by the cap 13, as may be necessary, to insure a leak-proof joint.

The casing member 12 has two inlet ports therein. This member is provided adjacent its upper end with a slot 22 (see Fig. 3), which constitutes one of the inlet ports for the mixing valve. It is also provided adjacent its lower end with an elongated slot 23 (Figs. 2 and 4), which constitutes the other inlet port for the mixing valve. The slot 22 constitutes an inlet port for the admission of the hot fluid, and the slot 23 constitutes an inlet port for the admission of the cold fluid.

Surrounding or extending over the port 22 is an inlet plate 24, having its edges rigidly connected to the cylindrical member 12 (Figs. 1, 2 and 3). The plate is provided with a threaded nipple or intake conduit 25, extending outwardly, as shown more clearly in Fig. 3 of the drawing. This plate is offset outwardly at its upper intermediate portion so as to form with the cylindrical member 12 an intake chamber 26 in communication with the inlet 22 (Fig. 3). The nipple or conduit 25 is adapted to have attached to it a conduit 27 (Fig. 3) for conducting hot water from a source of supply to the mixing valve, as will presently appear.

Attached over the inlet port 23 is a plate 28, which is offset outwardly at its lower intermediate portion and has its edges integral with or welded to the casing member 12 to form an inlet chamber 29 (Figs. 2 and 3) over the port 23. This plate is provided with an outwardly extending threaded projection 31, to which a conduit 32 (Fig. 3) is attached, and this conduit is adapted to conduct cold water from a source of supply to the mixing valve.

The cylindrical casing member 12 is provided in its lower portion with elongated discharge slots or ports 33 and 33ᵃ at opposite sides of the casing member 12, as shown more clearly in Fig. 4 of the drawing. The discharge ports 33 and 33ᵃ are slightly above the inlet port 23 for the cold liquid intake, as shown in Figs. 2 and 4. A suitable bottom cap member 34 is secured over the lower end of the casing member 12, and is provided with an axial downwardly extending threaded projection, discharge conduit, or nipple 35, which constitutes the discharge port for the mixing valve 10. The bottom portion of the cap immediately above the threaded portion is offset downwardly, as at 36, to form a valve seat for the discharge valve, as will presently appear.

The cap member 34 is attached in any suitable manner, as by welding, to the cylindrical casing member 12. This cap member has its side walls at opposite sides thereof offset outwardly to form with the lower end of the casing member 12 port chambers 30 and 30ᵃ (Fig. 4), which extend over the discharge ports 33, 33ᵃ, respectively. When all the parts are in the position shown in Fig. 4, the mixing chamber 40, hereinafter described, is in communication with the port chambers 30, 30ᵃ, through the ports 33, 33ᵃ. The lower end of the cylindrical casing member 12 has cut-out portions at opposite sides thereof to form with the bottom wall of the cap member what will be termed ports 37, 37ᵃ, in communication with the port chambers 30, 30ᵃ, respectively, whereby water or other liquid may pass from the mixing chamber 40 through the ports 33, 33ᵃ, and 37, 37ᵃ, to the discharge port 35.

Suitable means are provided within the casing 11 for shutting off and for controlling the passage of the liquids through said casing. In the form of construction selected to illustrate one embodiment of the invention, a spool shaped member, which for convenience of description will be termed the balanced spool valve or spool valve member 38, is provided for this purpose. This valve member may be made in any suitable manner, and has cylindrical end portions with its central connecting portion greatly reduced in diameter, as at 50, to form the annular mixing chamber 40 between the spool valve and casing member 12. This chamber extends entirely around the spool valve, as shown in Figs. 3, 5, and 6.

In the form of construction shown, the central section of the spool valve 38 has its ends enlarged in diameter, as shown at 39 and 41 (Figs. 2 and 4), and telescoped over, and rigidly secured to, these enlarged ends are cap members 42 and 43. These cap members are cylindrical and form what may be considered pistons engaging the inner surface of the casing member 12 and form therewith a more or less leak-proof sliding joint. The lower cap member 43 has its central portion offset downwardly, as at 44, and provided with an axial opening through which a threaded bolt 45 extends for attaching a disc valve 46 of fibre, or the like, to the underside of the downwardly offset portion 44, by means of a clamping nut 60. The disc 46 constitutes a valve for the discharge passage 35, and is adapted to engage the seat 36 for closing the discharge passage 35, as will presently appear. This is considered an important feature of the invention, since by using this mechanism for shutting off the passage of the liquid through the mixing valve, as well as utilizing the same for controlling the flow of the mixture and for regulating the temperature thereof, the use of the conventional shut-off valves for the hot and cold water conduits are eliminated and the entire flow control and temperature regulating mechanism is thereby greatly simplified.

The upper cap member 42 is provided with an enlarged axial opening 47 extending around the downwardly extending projection 15, and has attached thereto in any suitable manner, as by soldering, brazing, or the like, the upper end of a metal bellows 48 which extends downwardly through said opening 47, its lower end being attached to a block 49 to which the swivel head 17 is connected. The block 49 is provided with a recess for receiving the head 17, and a plate 51, secured to the block, is provided with an opening through which the valve stem 16 extends, thereby swivelling connecting the valve stem 16 to the block 49. The block 49 is provided with a downwardly extending projection 52, to which the upper end of a coil spring 53 is connected. The lower end of the spring 53 is attached to a projection 54 on the bolt 45.

In order that the spool valve 38 shall operate automatically to control the mixing of the cold and hot water, and for discharging the mixture at a predetermined temperature, the spool valve is filled with a highly volatile or thermo-sensitive fluid, such as methyl alcohol, or the like. The spool valve is made of relatively thin sheet metal in order that the heat will readily be conducted through the wall to the volatile material within the spool, thereby providing for the prompt automatic control of the temperature of the mixed liquids. When the interior of the spool becomes heated the methyl alcohol, or other volatile liquid, will expand, and this pressure will tend to increase the volume within the spool. But this volume can only increase if the spool valve moves downwardly against the tension of the spring 53. When the cold water port is opened too far, the preponderance of cold water causes the gas within the spool to contract and the spring 53 elevates the spool valve.

It will thus be seen that the temperature of the discharged liquid is controlled by a thermo-sensitive device, or, from another point of view, it may be termed a pressure sensitive device, since the pressure developed within the spool valve member determines the relative position of this member, which position in turn controls the proportionate amounts of hot and cold water admitted to the mixing chamber.

The expansion and contraction of the fluid within the spool valve is utilized for controlling the relative amounts of hot and cold liquid that are admitted to the mixing chamber 40, as will now be described. For instance, assuming that the mixing valve is in the position shown in Fig. 2, if the temperature and volume of water entering the intake passage 22 is such as to raise the temperature of the mixed liquid, it will cause an expansion of the fluid within the spool valve, and this expansion in turn will cause the valve to move downwardly, thus closing, or partially closing, the hot water inlet port 22. On the other hand, if the mixed liquid in the mixing chamber becomes too cool, the fluid within the spool valve will contract and the tension of the spring 53 will elevate the spool valve for closing off the cold liquid flowing through the inlet port 23 (Fig. 2) and opening the port 22, so that the relative amounts of cold and hot water, or other liquid, will be varied by admitting more hot water and less cold water.

The temperature of the mixture discharged from the mixing valve may be controlled within predetermined limits. These limits are set by raising and lowering the block 49 by rotating the valve stem 16, as by means of the valve wheel 55. When the mixing valve is closed, i. e., when the disc valve 46 is on its seat 36, no water passes into the discharge conduit 35, the cold water port 23 is open, and the hot water port 22 is closed, as will be obvious from an inspection of Fig. 2. When it is desired to open the valve and to set the mechanism so that water at a predetermined temperature will be discharged from the mixing valve, the valve stem 16 is rotated counterclockwise for elevating the spool 38, and with it the disc valve 46, which will permit the discharge of the mixed liquid from the mixing chamber.

It will be obvious from an inspection of Fig. 2 that when the valve 46 is closed the hot water port 22 will also be closed by the cap or piston 42, and the cold water port 23 will be open.

In opening the valve 46 the stem 16 is turned counterclockwise, elevating the balanced spool valve and gradually closing the cold water port 23 and gradually opening the hot water port 22. This movement is continued until the liquid discharged from the mixing valve is at the desired temperature, after which the device operates automatically to hold the temperature of the discharged liquid at substantially the predetermined amount. By turning the stem clockwise more cold and less hot liquid is admitted to the mixing chamber, and further turning of the stem in this same direction will finally seat the valve 46 and close the discharge passage.

In the operation of the mixing valve, assuming the parts are in the position shown in Fig. 2, the hot water enters through the conduit or passage 25 through the intake chamber 26, port 22, and into the mixing chamber 40. The cold water simultaneously enters through the passage 31, intake chamber 29, port 23 and into the mixing chamber 40, and mixes with the hot water. The mixture passes out into the port chambers 30, 30ª (Fig. 4) through the outlet ports 33, 33ª, and from these chambers the mixture flows back into the casing 12 through passages 37, 37ª, beneath the spool valve 38, and is discharged through the discharge passage 35. In other words, the passage 33, 30 and 37, on one side of the casing, and the passage 33ª, 30ª and 37ª, on the other, constitute what may be termed by-passes for the mixture in the mixing chamber to flow around the lower end of the spool valve to the discharge port.

Suitable means are provided for stopping the flow of the mixture if its temperature rises materially above or materially below a predetermined amount. For instance, if after the mixing valve has been set and the temperature of the hot liquid rises above the set or predetermined amount, this will cause the spool to be lowered, gradually shutting off the port 22 and further opening the port 23. If the temperature still continues to rise, the volatile fluid within the spool will continue to expand, causing the spool to be lowered until the valve 36 finally closes and prevents the operation of the mixing valve. On the other hand, if the temperature of the mixture falls below the set or predetermined amount, the spool will rise, opening the port 22 for admitting more hot liquid and gradually closing the port 23 for shutting off the cold liquid. If the temperature of the mixture for any reason whatever continues to fall and gets materially below that desired, the volatile fluid within the spool contracts and the spool continues to rise until the discharge ports 33, 33ª, (Fig. 4) are finally closed, thus preventing the further operation of the valve.

It will thus be seen that in the operation of the spool valve it may be manually operated to open and close the discharge valve 46, and may be set to operate at any predetermined temperature within its limit of operation. It will function to automatically mix hot and cold water, or other fluids, and maintain the discharging liquid at a predetermined temperature. It will automatically shut off the flow of liquid if for any reason whatever, during the nominal operation of the valve, the following conditions obtain:

1. The cold water fails;
2. The hot water fails;
3. The hot water turns cold;
4. The cold water turns hot.

Any water or other liquid leaking past the lower end of the spool valve will find its way to the discharge port and will not affect the operation of the device.

While the casing 11 is shown as being made of several parts welded together, it is understood that it may be cast or otherwise constructed, as may be necessary or desirable.

In Fig. 6 is shown a modified form of the invention, which, for all practical purposes, is the preferred form of construction. The broad principle is the same as that already described, but the form shown in Fig. 6 contains refinements not present in the structures shown in the remaining figures.

In this form of construction the reference character 50 designates the mixing valve, which comprises a casing 51 which may be of cast portions, or it may be stamped in sections from sheet metal, having a lower portion 52 externally threaded at its upper end and a cap portion 53 threaded onto said lower portion. The lower portion is provided with a discharge outlet 54, adapted to have a discharge conduit attached thereto in the usual manner. The opening for the discharge is restricted at what will be termed its upper end, to form a valve opening 55 enlarged or counterbored above to form a valve seat 56, as will presently appear.

The lower portion 52 of the casing 51 has lateral projections constituting inlet openings or members 57, 58, which are arranged at opposite sides of the casing and are preferably, though not necessarily, integral with the casing. These inlet members may be slightly offset outwardly to form inlet chambers 59 and 61, respectively, as will presently appear. These inlet members are internally threaded for attachment to suitable conduits leading from sources of hot and cold water, respectively, where the valve is used in bath rooms. The inlet 57 is for the hot liquid, and the inlet 58 admits the cold liquid which are mixed in a mixing chamber, as will be described below.

The cap member 53 is stepped, and the first step 59a has its horizontal portion extending over the lower section, as shown in Fig. 6, for engaging a packing thrust cylindrical ring or gland member 40 for holding a packing ring member 61a clamped in position to form a water-tight joint, as will presently appear. The uppermost stepped portion is provided with an axial opening 62, through which the cylindrical portion of a spring seat 63 and valve stem 60 extend.

A cylindrical liner 64 is seated within the lower portion of the casing 51 by a press fit, and is also held in its lowermost position against the bottom of the said lower portion by the packing material 61a, which in turn is forced down by the ring 40. This ring is clamped in position by the cap portion 53, as shown in Fig. 6.

The liner member 64 is employed for inexpensively forming chambers and valve openings, as will now be described. This liner is provided with a slot or valve opening 65 adjacent its upper end, in communication with what for convenience of description will be termed the hot water inlet chamber 59, and at its opposite side adjacent its lower end it is provided with a slot or valve opening 66 opposite the cold water inlet chamber 61. The liner 64 is also provided with a slot 67 (Fig. 7), which is slightly above the slot 66 and which constitutes a discharge opening for the mixed hot and cold liquid. The lower end of the liner is cut away to form a slot 68 between the liner and the bottom wall of the lower section 52 of the casing for cooperating with the slot 67 in forming a discharge opening for the mixed liquid.

The lower section 52 of the casing is provided with an offset 69 (Fig. 7), which places the slots 67 and 68 in permanent communication with one another, whereby the mixed liquid may pass from the mixing chamber to the discharge valve opening 55, as will presently appear.

Suitable means are provided for automatically controlling the mixing and discharge of the liquid, which will now be described. In the form of the device illustrated in Figs. 6 and 7, which is by way of example only, thermally controlled mechanism is employed for this purpose. As shown, a spool or spool-shaped valve member 71 is employed. This member comprises end or cap members 72 and 73, which are of a diameter to slidably engage the inner walls of the liner member 64, as shown in Fig. 6, and make a close fit therewith. A central restricted member 74, circular in cross-section, is provided, having its ends enlarged and rigidly connected to the upper and lower cap members 72, 73. The central portion of the spool valve member 71 is spaced inwardly from the liner 64, and forms therewith a mixing chamber 75 which extends entirely around the restricted portion 74 of the spool valve 71.

The inwardly extending flanges 76 and 77 of the end caps 72, 73, constitute valve closures for the openings 65 and 66. These flanges are spaced apart a distance substantially the same as the distance between the slots 65, 66, so that when the slot 65 is wide open, as shown in Fig. 6, the slot 66 will be closed. By means of this arrangement the proportionate amount of hot and cold water to constitute a mixture of the desired temperature is admitted into the mixing chamber 75.

Suitable means are provided for automatically adjusting the spool valve 71, so that the temperature of the mixture of the water discharged from the valve may be a predetermined amount. In the form of construction shown, the top wall of the cap 72 is provided with an axial opening 78, and secured around this opening is the open end of a metal bellows or Sylphon 79, the lower end of which is rigidly secured to a plate 81. Mounted within the bellows is an internally threaded plug 82, which is secured to the plate 81 as by means of a setscrew 83. It will thus be seen that the interior of the spool valve 71, outwardly of the metal bellows 79, is water and gas tight.

In order that the spool valve 71 shall operate automatically to control the mixing of the cold and hot water for discharging the mixture at a predetermined temperature, this space is filled with a highly volatile or thermo-sensitive fluid, such as methyl alcohol, or the like. The spool valve 71 is preferably made of heat-conducting material, and is thin, so that it is very sensitive to the temperature of the mixed liquid.

Hot water entering through the slot 65 will heat the thermo-sensitive fluid within the spool valve 71, causing the same to expand and create a pressure within this valve. This pressure will tend to cause the spool valve 71 to descend, and if we assume that the parts are in the position of Fig. 6 the lowering of the spool valve will tend to close the hot water slot 65 and open the slot 66 for admitting cold water to the mixing chamber 75.

The lower end of the spool valve member 71 has attached thereto a valve seat holder 84, and this holder is provided with a recess 85 on its lower surface in which a valve member 86 is seated. The valve member 86 may be of any suitable material, such as fiber, rubber, or the like, and is adapted to seat on the bottom of the valve seat 56 for closing the opening 55, as is usual in such valve constructions. The parts are held in assembled relation by a stud 87, which extends down through the bottom wall of the cap member 73 and is provided with an internally threaded axial opening which is engaged by the screw 80, said screw extending through the valve member 86 and engaging in the threaded opening in the stud 87 for holding the parts in assembled relation.

The block or plug 82 is internally threaded for engaging the threaded valve stem 60, and the upper end of the valve stem is reduced and squared and extends through a corresponding squared opening in a metal plate 88 embedded in a handle member or knob of plastic or other suitable material, 89, whereby, upon rotation of the handle member 89, the stem 60 may be threaded into or unthreaded from the block 82 for raising and lowering the spool valve 71, and with it the valve member 86. It will thus be seen that by turning the handle 89, and with it the valve stem 60, counterclockwise, the block 82 will be forced downwardly, and with it the spool 71, for closing the valve 86, and vice versa.

Assuming now that the handle or knob 89 has been turned counterclockwise for closing the valve 86, it is evident that if, while the valve is closed, the room temperature should materially increase, the volatile fluid within the spool will continue to expand and might, by this excessive pressure, rupture the bellows or injure the valve, or some of the parts thereof. Suitable means are provided for preventing excessive pressure developing within the valve member 71. In the form of construction shown, a spring 91 is provided for relieving the pressure. The spring 91 surrounds the valve stem 60 and abuts against the spring seat 63, which is non-rotatably mounted in the opening 62 in the cap member 51. The lower end of the spring engages a spring seat 92, which rests on an anti-friction washer 93 held in adjusted position by a nut 94 held in locked position on the valve stem by a set nut 95. By means of this arrangement the valve stem 60 is free to slide upwardly through the spring seat 63, and may rotate in the spring seats 63 and 92, independently of the spring.

When the valve 86 is closed and the temperature of the room increases materially, the expansion of the fluid within the spool valve 71 will tend to force the spool downwardly, and the reaction against the valve seat 56 will force the valve stem upwardly, against the compression of the spring 91, for preventing excessive pressure developing within the spool 71.

In the operation of the device, the knob or handle member 89 is turned clockwise for opening the valve, and assuming now that the valve has been opened to the position shown in Fig. 6 hot water will enter the mixing chamber through the passage 65, and this in turn will heat the thermo-sensitive fluid within the spool through the thin walls thereof. The expansion of this thermo-sensitive fluid will cause the spool valve 71 to move downwardly for closing off the admission of the heated liquid, and at the same time the slot 66 will be partially opened for admitting cold water to the mixing chamber.

If it is desired that the water being discharged from the valve at 54 be hotter, the handle or knob 89 is turned clockwise, which elevates the block 82, and with it the spool valve 71, for opening the port 65 and for closing the port 66. In Fig. 6 the port 65 is wide open and the port 66 closed. If it is desired that the valve be set so that the mixture is not so hot, the knob 89 is turned counterclockwise for lowering the valve 71 for partially closing the port 65 and partially opening the port 66.

After the desired temperature of the mixture has been obtained, the spool valve member will operate automatically for holding the temperature at the required amount. If, after setting the valve, the mixture for any reason increases in temperature, the thermo-sensitive fluid within the spool valve 71 will expand, thus causing the valve 71 to move downward, which in turn gradually closes the hot water port at 65 and opens the cold water port at 66, until the temperature is back to that at which the valve was set. If, however, for any reason, there is still further heating of the thermo-sensitive fluid, as when the cool water entering through the port 66 fails or becomes hot, the thermo-sensitive fluid will expand and will finally cause the valve member 86 to engage the valve seat 56, thus closing the opening 55. On the other hand, if the valve is set to deliver water at a selected temperature and for any reason the mixture becomes cold, as when the hot water fails, the lowering of the temperature of the thermo-sensitive fluid within the spool valve 71 will contract, thus causing the air pressure to be greater on the outside of the spool valve 71 than the pressure of the thermo-sensitive fluid within the spool valve; and hence these unequal pressures will cause the spool to rise so the bellows 79 will occupy more space in the spool, and this in turn cuts off the cold water inlet 66. This continues until the temperature of the water within the mixing chamber is at such a low point as to cause the spool 71 to rise still further and close the exit valve 67 in the sleeve 64, preventing any further water from flowing through the mixing chamber.

It will thus be seen that so long as the hot and cold water supply remains constant and at constant temperatures, the spool valve in both forms of the device may be set to deliver hot and cold water at any desired temperature, and that even though the temperature of either the hot or cold water vary within broad limits the valve will automatically change to deliver the mixture at a selected temperature.

In event the hot water turns cold, or the cold water turns hot, or either fails altogether, the valve will function to shut off the discharge of the liquid from the valve. Furthermore, in event the environment temperature in the room increases while the valve is closed, the construction is such as to prevent injury to the bellows or any other part of the valve.

In other words, there are six variables that are kept under control by this valve, as follows:

1. Variable hot and cold water pressures;
2. Variable hot and cold water volume;
3. Variable temperature of hot water;
4. Variable temperature of cold water;
5. Variable atmospheric temperature;
6. Variable delivery temperature.

It is thought from the foregoing, taken in connection with the accompanying drawing, that the construction and operation of my device will be apparent to those skilled in the art, and that changes in size, shape, proportion and details of construction may be made without departing from the spirit and scope of the appended claims.

I claim as my invention:

1. A mixing valve for hot and cold liquids comprising a casing, hot and cold water inlets for said casing, a valve member having enlarged cylindrical ends forming valves for controlling said inlets and having a constricted central portion forming with said casing a mixing chamber within said casing for mixing the water from said inlets, a discharge outlet for discharging the mixture from said chamber, a valve carried by said valve member for closing said outlet, manually operated means for opening and closing said last named valve, and means enclosed within said valve member for automatically controlling the mixing of hot and cold water discharged from said mixing chamber for maintaining said mixture at a predetermined temperature.

2. In a liquid mixing and temperature control valve, a casing, intake ports through the side wall of said casing for hot and cold liquids, a single discharge port for said liquids, a hollow valve member slidably mounted within said casing and having a central reduced portion forming with the walls of said casing a mixing chamber, said valve member constituting a valve for opening and closing said inlet ports, a metal bellows connected to the outer end of said valve member and extending down into said valve member, a block connected to the inner end of said bellows, a valve stem threaded in said casing and swivelly connected to said block, a spring for connecting the lower end of said valve member to said block, a discharge valve for said discharge port carried by said valve member, and discharge passages for conducting the mixed liquids around the lower end of said valve member from said mixing chamber to said discharge port, said valve member having a thermo-sensitive liquid therein and said intake ports being at different heights whereby said discharge valve may be opened and closed by rotating said stem for admitting hot and cold liquids to said mixing chambers so that the mixed liquid will be discharged at a predetermined temperature and be automatically maintained at that temperature.

3. A mixing and thermal control valve comprising a casing, a valve member movably mounted within said casing and having a restricted portion forming with said casing a mixing chamber, an intake port for admitting hot liquid to said mixing chamber adapted to be opened and closed by said valve member, an intake port for admitting a cold liquid to said mixing chamber and adapted to be opened and closed by said valve member, the parts being so constructed that when said valve member moves in one direction the cold water port will be gradually closed and the hot water port gradually opened, and vice versa, said valve member being hollow and filled with a thermo-sensitive fluid, a discharge passage for said mixing chamber, means for manually setting said valve member at a predetermined position for discharging the mixed liquid from said mixing chamber at a predetermined temperature, said means comprising a valve stem, a metal bellows connecting said valve member to said stem whereby when the temperature of the mixed liquid within said chamber increases the expansion of said thermo-sensitive fluid for moving said valve member in one direction for admitting to said chamber an increased proportionate amount of the cold liquid, and means including a spring for moving the valve member in the opposite direction for admitting an increased proportionate amount of said hot liquid for raising the temperature of the liquid discharged from said chamber.

4. A mixing valve comprising a casing, hot and cold water inlets in said casing, a discharge port for said casing, a hollow valve member within said casing for opening one inlet while closing the other and vice versa, said valve having a restricted portion cooperating with said casing for forming a mixing chamber for mixing hot and cold liquids entering through said inlets, and means including a bellows within said valve member, spaced inwardly from the sidewalls of said member to form a chamber for containing a heat sensitive fluid for automatically controlling the movements of said valve member, and for closing said port when the temperature of the mixed liquids rises above a predetermined amount.

5. A hot and cold water mixing valve comprising a casing having elongated, slotted inlets for the admission of hot and cold liquids, respectively, a discharge port, a hollow valve member, means on said valve member for controlling the relative amounts of hot and cold liquids admitted to said casing through said inlets, said member having its central portion constricted in diameter to form with said casing a mixing chamber for said liquids surrounding said member, and means including a bellows element extending its full length down into said valve member for forming with said member a receptacle for containing a thermo-sensitive fluid for operating said valve member for controlling the temperature of the mixed liquids discharged from said port.

6. A hot and cold water mixing valve comprising a casing having a discharge opening, said casing having slotted inlets, chambers over said slotted inlets, inlet conduits for conducting hot and cold liquids to said chambers, respectively, a thin walled hollow valve member having enlarged closed ends, slidable over said inlets for controlling the admission of hot and cold liquids through said slotted inlets, respectively, said valve member having a restricted intermediate portion surrounding the same and forming with the inner walls of said casing a mixing chamber, means including a bellows within said valve member for automatically controlling the movements of said valve member for maintaining the liquid discharged from said casing at a substantially constant temperature, adjustable means connected to said bellows and extending to the exterior of said casing for adjusting said valve member for delivering water passing through said valve member at a substantially constant predetermined temperature, a valve for said discharge opening operated by said valve member and resilient means for preventing excessive pressure developing within said valve member.

7. A mixing valve comprising a casing having cold and hot water inlets and a discharge port, a hollow valve member within said casing for controlling said inlets and port, said valve member having a restricted portion cooperating with said casing for forming a mixing chamber for liquids entering said casing through said inlets, means for manually setting said member for discharging the mixed liquid at a predetermined temperature and means including a bellows within said valve member and having its side walls cooperating with the side walls of said member for forming a chamber for containing a thermo-sensitive fluid for automatically controlling the movements of said valve member for maintaining the liquid discharged through said port at a predetermined temperature.

8. A valve for mixing two liquids of different temperatures comprising a casing defining a mixing chamber and having a plurality of inlet ports and a single outlet port opening into the chamber at spaced points, and a device for opening and closing said ports including a hollow valve member having a flexible wall, a manually adjustable element carried by the casing engaging said wall, and temperature responsive liquid in said chamber for supporting and moving said wall with respect to the valve member to displace the latter in cooperation with and with respect to said manually adjustable element, said valve member sliding back and forth across the inlet ports and having a valve element closing said outlet port at one limit of movement of the valve member, the positive displacement effort of both the adjustable element and the wall as supported by the temperature responsive liquid being additive with respect to the displacement of said valve member in said chamber to vary and determine the range of temperature of mixed liquids passing through said outlet port when open and to close said outlet port automatically when the temperature of mixed liquids varies to a point outside said range and manually when said manually adjustable element is moved to a predetermined point.

9. A thermo-sensitive valve comprising a cylinder having intake valve ports therein, a spool-shaped casing of thin heat conducting material provided with side and end walls and having the exteriors of its end portions cylindrical, smooth, and unobstructed and of materially greater diameter than its intermediate portion for forming closures for said intake valve ports, said valve having one of its end walls provided with an axial opening, a metal bellows extending through said opening and connected at one end to the portion of the end wall surrounding the opening, and a closure for the opposite end of said bellows for forming a closed chamber within said casing for containing a thermo-sensitive fluid.

10. A thermo-sensitive valve including a cylinder having ports therein and a spool-shaped sheet metal casing in the cylinder provided with side and end walls and having its end portions cylindrical and of greater diameter than its intermediate portion to cooperate with the ports to provide a valving action, said valve having one of its end walls provided with an axial opening a metal bellows extending through said opening and connected at one end to the portion of the end wall surrounding the opening, a closure for the opposite end of said bellows for forming a closed chamber within said casing for containing a thermo-sensitive fluid, and a valve secured to the other end wall of said casing.

P. A. BIRCHFIELD.

REFERENCES CITED

The following references are of record in the file of this patent:

UNITED STATES PATENTS

| Number | Name | Date |
|---|---|---|
| 390,960 | Gustin | Oct. 9, 1888 |
| 1,244,184 | Dunwoodie | Oct. 23, 1917 |
| 1,271,446 | Dobson | July 2, 1918 |
| 1,707,109 | Blair | Mar. 26, 1929 |
| 1,900,221 | Beardsley | Mar. 7, 1933 |
| 1,985,929 | Jorgensen | Jan. 1, 1935 |
| 2,014,526 | Henning | Sept. 17, 1935 |
| 2,072,645 | McLaughlin | Mar. 2, 1937 |
| 2,086,129 | Hamilton | July 6, 1937 |
| 2,282,152 | Babbin | May 5, 1942 |